(12) United States Patent
Mino et al.

(10) Patent No.: US 6,822,830 B2
(45) Date of Patent: Nov. 23, 2004

(54) THIN-FILM MAGNETIC HEAD AND METHOD OF MANUFACTURING SAME

(75) Inventors: Tetsuya Mino, Tokyo (JP); Atsushi Yamaguchi, Tokyo (JP); Seiji Yari, Tokyo (JP)

(73) Assignee: TDK Corporation, Tokyo (JP)

( * ) Notice: Subject to any disclaimer, the term of this patent is extended or adjusted under 35 U.S.C. 154(b) by 140 days.

(21) Appl. No.: 09/942,871

(22) Filed: Aug. 31, 2001

(65) Prior Publication Data

US 2002/0135934 A1 Sep. 26, 2002

(30) Foreign Application Priority Data

Jan. 16, 2001 (JP) .................................. 2001-007499

(51) Int. Cl.⁷ .................................................. G11B 5/127
(52) U.S. Cl. .................................................... 360/126
(58) Field of Search ............................. 360/126, 317, 360/318, 321, 319

(56) References Cited

U.S. PATENT DOCUMENTS

| | | | |
|---|---|---|---|
| 5,111,352 A | * 5/1992 | Das et al. | 360/321 |
| 5,590,008 A | 12/1996 | Tanabe et al. | 360/126 |
| 5,774,308 A | * 6/1998 | Ohtsuka et al. | 360/126 |
| 5,812,350 A | * 9/1998 | Chen et al. | 360/126 |
| 5,910,870 A | * 6/1999 | Ishiwata | 360/317 |
| 6,108,167 A | 8/2000 | Tateyama et al. | 360/126 |
| 6,275,360 B1 | * 8/2001 | Nakamoto et al. | 360/319 |
| 6,306,311 B1 | * 10/2001 | Han et al. | 216/22 |
| 6,338,899 B1 | * 1/2002 | Fukuzawa et al. | 428/332 |
| 6,353,511 B1 | * 3/2002 | Shi et al. | 360/126 |
| 6,466,416 B1 | * 10/2002 | Honjo et al. | 360/317 |
| 6,504,677 B1 | * 1/2003 | Han et al. | 360/126 |
| 6,507,457 B2 | * 1/2003 | He et al. | 360/126 |
| 6,549,370 B1 | * 4/2003 | Kamijima | 360/126 |

\* cited by examiner

*Primary Examiner*—Tianjie Chen
(74) *Attorney, Agent, or Firm*—Oliff & Berridge, PLC (57) ABSTRACT

A top pole layer in a write head includes, in a pole portion, a first layer having surfaces one of which is adjacent to a write gap layer, a second layer having surfaces one of which is adjacent to the other surface of the first layer, and a third layer having surfaces one of which is adjacent to the other surface of the second layer. The first to third layers have different saturation flux densities such that the closer the layer to the write gap layer, the higher saturation flux density.

30 Claims, 8 Drawing Sheets

THIN-FILM MAGNETIC HEAD AND METHOD OF MANUFACTURING SAME

BACKGROUND OF THE INVENTION

1. Field of the Invention

The present invention relates to a thin-film magnetic head having at least an induction-type electromagnetic transducer and a method of manufacturing such a thin-film magnetic head.

2. Description of the Related Art

Thin-film magnetic heads for hard disk drives include composite type thin-film magnetic heads that have been widely used. A composite type head is made of a layered structure including a write (recording) head having an induction type electromagnetic transducer for writing and a read (reproducing) head having a magnetoresistive element (hereinafter also referred to as "MR element") for reading.

The write head has a bottom pole layer and a top pole layer each of which has a magnetic pole portion. The magnetic pole portions of the bottom and top pole layers are located on a side of the air bearing surface and opposed to each other. The write head further has a write gap layer provided between the pole portions of the bottom and top pole layers, and a thin-film coil provided such that at least a part of the coil is insulated from the bottom and top pole layers.

In recent years, to achieve higher recording density of a hard disk drive, reduction in track width of a write head in a thin-film magnetic head and increase in coercivity of a recording medium are being pursued. In association with such reduction in track width and increase in coercivity, the write head is required to generate a stronger magnetic field. Conventionally, Permalloy (NiFe) is often used as the material of a magnetic pole layer. In order to increase the intensity of the magnetic field generated by the write head, a material having a saturation flux density higher than that of Permalloy has to be used for the magnetic pole layer.

Japanese Patent Application Laid-Open Nos. 5-120630 and 6-124415 disclose a thin-film magnetic head for addressing the demand of higher recording density of a hard disk drive, in which at least one of magnetic pole layers in a write head is made up of two layers, i.e., a first layer that is not in contact with a write gap layer and a second layer that is in contact with the write gap layer. The second layer is made of a material having a saturation flux density higher than that of the material of the first layer. In the head of such a structure, decreases in the magnetic flux reaching to the tip of the pole portion on a side of a recording medium is suppressed, so that the intensity of the magnetic field generated by the write head can be increased.

On the other hand, in order to realize higher recording density of a hard disk drive, recently, it is required that the magnetic pole width of a write head be reduced to 0.5 $\mu$m or less. When the magnetic pole width is so reduced, it becomes necessary to compensate decrease in the generated magnetic field in association with the reduction in the magnetic pole width. For that purpose, in a head in which the magnetic pole layer is made up of two layers as described above, the second layer having a higher saturation flux density has to be made relatively thick.

However, if the thickness of the second layer is increased, the area of a region in which the strong magnetic field is generated in a medium facing surface, that is, the area of an end portion on the medium-facing-surface side of the second layer, is increased. It increases spread of the magnetic flux on the medium facing surface. As a result, a magnetization pattern in the recording medium becomes large, and it causes problems in that it becomes difficult to improve recording density and non-linear transition shift (hereinafter referred to as NLTS) becomes large.

OBJECTS AND SUMMARY OF THE INVENTION

An object of the invention is to provide a thin-film magnetic head capable of generating a strong magnetic field from a magnetic pole portion in a medium facing surface and suppressing spread of a magnetic flux in the medium facing surface even when a magnetic pole width is small, and to provide a method of manufacturing such a thin-film magnetic head.

A thin-film magnetic head of the invention comprises: a medium facing surface that faces toward a recording medium; a first magnetic layer and a second magnetic layer magnetically coupled to each other and including magnetic pole portions that are opposed to each other on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers. At least one of the first and second magnetic layers includes, at least in the magnetic pole portion, a first layer having surfaces one of which is adjacent to the gap layer, a second layer having surfaces one of which is adjacent to the other surface of the first layer, and a third layer having surfaces one of which is adjacent to the other surface of the second layer. The second layer has a saturation flux density higher than a saturation flux density of the third layer, and the first layer has a saturation flux density higher than the saturation flux density of the second layer.

In the thin-film magnetic head of the invention, at least one of the first and second magnetic layers includes, at least in the magnetic pole portion, the first to third layers having different saturation flux densities such that the closer the layer to the gap layer, the higher the saturation flux density. This makes it possible to suppress spread of the magnetic flux in the medium facing surface while increasing the intensity of a magnetic field generated from the magnetic pole portion in the medium facing surface.

In the thin-film magnetic head of the invention, when the thickness of the first layer in the medium facing surface is expressed as T1 and the thickness of the second layer in the medium facing surface is expressed as T2, the value of T1/(T1+T2) may be in a range from not less than 0.025 to not more than 0.5. The value of T1/(T1+T2) may be also in a range from not less than 0.05 to not more than 0.25.

In the thin-film magnetic head of the invention, when the saturation flux density of the first layer is expressed as B1 and the saturation flux density of the second layer is expressed as B2, the value of B2/B1 may be in a range from not less than 0.65 to not more than 0.95. The value of B2/B1 may be also in a range from not less than 0.75 to not more than 0.95.

According to the invention, there is provided a method of manufacturing a thin-film magnetic head comprising: a medium facing surface that faces toward a recording medium; a first magnetic layer and a second magnetic layer magnetically coupled to each other and including magnetic pole portions that are opposed to each other on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers. The method comprises the steps of: forming the first magnetic layer; forming the gap layer on the first magnetic layer; forming the second magnetic layer on the gap layer; and forming the thin-film coil. At least one of the steps of forming the first magnetic layer and forming the second magnetic layer forms, at least in the magnetic pole portion, a first layer having surfaces one of which is adjacent to the gap layer, a second layer having surfaces one of which is adjacent to the other surface of the first layer, and a third layer having surfaces one of which is adjacent to the other surface of the second layer. The second layer has a saturation flux density higher than a saturation flux density of the third layer, and the first layer has a saturation flux density higher than the saturation flux density of the second layer.

In the method of manufacturing a thin-film magnetic head of the invention, at least one of the first and second magnetic layers includes, at least in the magnetic pole portion, the first to third layers having different saturation flux densities such that the closer the layer to the gap layer is, the higher the saturation flux density is. This makes it possible to suppress spread of the magnetic flux in the medium facing surface while increasing the intensity of a magnetic field generated from the magnetic pole portion in the medium facing surface.

In the method of manufacturing a thin-film magnetic head of the invention, when the thickness of the first layer in the medium facing surface is expressed as T1 and the thickness of the second layer in the medium facing surface is expressed as T2, the value of $T1/(T1+T2)$ may be in a range from not less than 0.025 to not more than 0.5. The value of $T1/(T1+T2)$ may be also in a range from not less than 0.05 to not more than 0.25.

In the method of manufacturing a thin-film magnetic head of the invention, when the saturation flux density of the first layer is expressed as B1 and the saturation flux density of the second layer is expressed as B2, the value of $B2/B1$ may be in a range from not less than 0.65 to not more than 0.95. The value of $B2/B1$ may be also in a range from not less than 0.75 to not more than 0.95.

Other and further objects, features and advantages of the invention will appear fully from the following description.

DETAILED DESCRIPTION OF THE PREFERRED EMBODIMENTS

[First Embodiment]

Figure 1A:
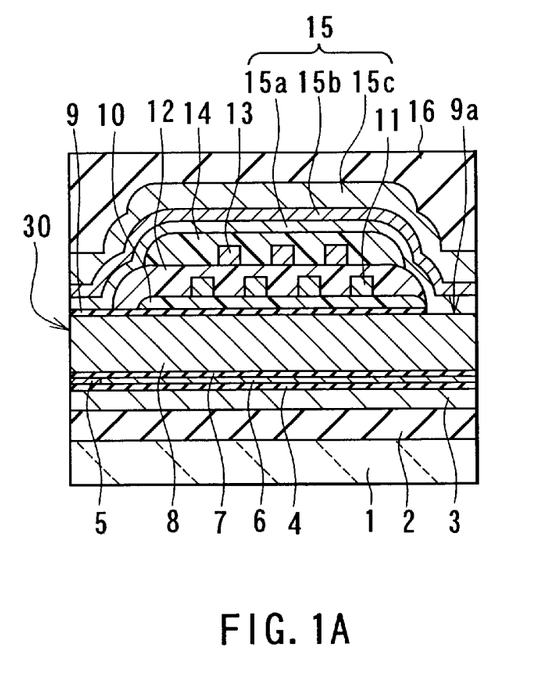
FIGS. 1A and 1B are cross sections of a thin-film magnetic head according to a first embodiment of the invention.
Figure 1B:
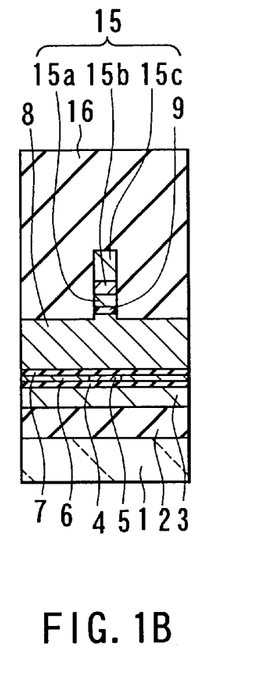

Embodiments of the invention will now be described in detail with reference to the accompanying drawings. First, referring to FIGS. 1A and 1B, the configuration of a thin-film magnetic head according to a first embodiment will be described. FIGS. 1A and 1B are cross sections of a thin-film magnetic head according to the embodiment. FIG. 1A is a cross section orthogonal to the air bearing surface. FIG. 1B is a cross section of the magnetic pole portion parallel to the air bearing surface.

The thin-film magnetic head according to the present embodiment comprises: a substrate 1 made of a ceramic material; an insulating layer 2 made of an insulating material and formed on the substrate 1; a read head formed on the insulating layer 2; a write head (induction-type electromagnetic transducer) formed on the read head; and a protection layer 16 made of an insulating material to cover the write head. The thin-film magnetic head further has an air bearing surface 30 as a medium facing surface that faces toward a recording medium.

The read head comprises: a bottom shield layer 3 made of a magnetic material and formed on the insulating layer 2; a bottom shield gap film 4 made of an insulating material and formed on the bottom shield layer 3; an MR element (magnetoresistive element) 5 for reading formed on the bottom shield gap film 4 and having an end located in the air bearing surface 30; and a pair of electrode layers 6 formed on the bottom shield gap film 4 and electrically connected to the MR element 5. The read head further comprises: a top shield gap film 7 formed so as to cover the bottom shield gap film 4, the MR element 5 and the electrode layers 6; and a top-shield-layer-cum-bottom-pole layer (hereinafter referred to as bottom pole layer) 8 made of a magnetic material and formed on the top shield gap film 7. The MR element 5 may be an element made of a magnetosensitive film that exhibits a magnetoresistive effect, such as an anisotropic magnetoresistive (AMR) element, a giant magnetoresistive (GMR) element, or a tunnel magnetoresistive (TMR) element.

The write head comprises: the bottom pole layer 8; a write gap layer 9 made of an insulating material and formed on the bottom pole layer 8; and an insulating layer 10 formed in a portion on the write gap layer 9 in which a thin-film coil is to be formed. The write head further comprises: a first layer 11 of the thin-film coil made of a conductive material and formed on the insulating layer 10; an insulating layer 12 formed so as to cover the insulating layer 10 and the first layer 11 of the thin-film coil; a second layer 13 of the thin-film coil made of a conductive material and formed on the insulating layer 12; an insulating layer 14 formed so as to cover the second layer 13 of the thin-film coil, and a top pole layer 15 for the write head, made of a magnetic material and formed on the write gap layer 9 and the insulating layer 14. The protection layer 16 is formed so as to cover the top pole layer 15. An end of the insulating layer 12 closer to the air bearing surface 30 is located at a predetermined distance from the air bearing surface 30 and defines the throat height. The throat height is the length (height) of portions of the two magnetic pole layers facing each other with the write gap layer in between, between the air-bearing-surface-side end and the other end.

Each of the bottom pole layer 8 and the top pole layer 15 has a magnetic pole portion that is a portion located on a side of the air bearing surface 30, and those magnetic pole portions are opposed to each other, with the write gap layer 9 being located in between. The magnetic pole portion of the top pole layer 15 has a width equal to the track width of the write head. An end of the top pole layer 15 farther from the air bearing surface 30 is connected to and magnetically coupled to the bottom pole layer 8 through a contact hole 9a formed in the write gap layer 9. The first and second layers 11 and 13 of the thin-film coil are wound around the contact hole 9a.

As thus described, the thin-film magnetic head according to this embodiment comprises the medium facing surface that faces toward a recording medium (the air bearing surface 30), the read head, and the write head. The read head includes the MR element 5, and the bottom shield layer 3 and the top shield layer (bottom pole layer 8) for shielding the MR element 5. The bottom shield layer 3 and the top shield layer have portions located on a side of the air bearing surface that are opposed to each other, the MR element 5 being located between these portions.

The write head includes the bottom pole layer 8 and the top pole layer 15 that are magnetically coupled to each other. The bottom pole layer 8 and the top pole layer 15 include the magnetic pole portions that are opposed to each other and placed in regions on a side of the air bearing surface 30. The write head further includes: the write gap layer 9 placed between the pole portion of the bottom pole layer 8 and the pole portion of the top pole layer 15; and the layers 11 and 13 of thin-film coil at least a part of which is placed between the bottom pole layer 8 and the top pole layer 15 and insulated from the bottom pole layer 8 and the top pole layer 15.

In the embodiment, the bottom pole layer 8 corresponds to the first magnetic layer of the invention, and the top pole layer 15 corresponds to the second magnetic layer of the invention. In place of the bottom pole layer 8, there may be provided a top shield layer, a bottom pole layer, and a separation layer made of a non-magnetic material for separating the top shield layer and the bottom pole layer from each other.

In the embodiment, the top pole layer 15 includes, in the magnetic pole portion, a first layer 15a having surfaces one of which (the bottom surface) is adjacent to the write gap layer 9; a second layer 15b having surfaces one of which (the bottom surface) is adjacent to the other surface (the top surface) of the first layer 15a; and a third layer 15c having surfaces one of which (the bottom surface) is adjacent to the other surface (the top surface) of the second layer 15b. A saturation flux density B2 of the second layer 15b is higher than a saturation flux density B3 of the third layer 15c, and a saturation flux density B1 of the first layer 15a is higher than the saturation flux density B2 of the second layer 15b. That is, the saturation flux densities of the first layer 15a to the third layer 15c are made different such that the closer the layer to the write gap layer 9, the higher the saturation flux density.

In the thin-film magnetic head according to the embodiment, the bottom pole layer 8 is disposed on the rear side in the travel direction of the recording medium (the air-inflow-end side in a slider including the thin-film magnetic head), and the top pole layer 15 is disposed on the front side in the travel direction of the recording medium (the air-outflow-end side of the slider including the thin-film magnetic head).

Referring now to FIGS. 2A to 4A and FIGS. 2B to 4B, a method of manufacturing the thin-film magnetic head according to the embodiment will be described. FIGS. 2A to 4A show cross sections orthogonal to the air bearing surface, and FIGS. 2B to 4B show cross sections of the magnetic pole portions each parallel to the air bearing surface.

Figure 2A:
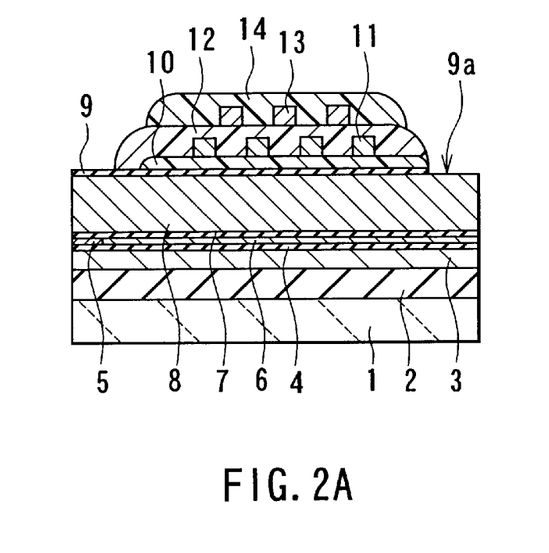
FIGS. 2A and 2B are cross sections for illustrating a method of manufacturing a thin-film magnetic head according to the first embodiment of the invention.
Figure 2B:
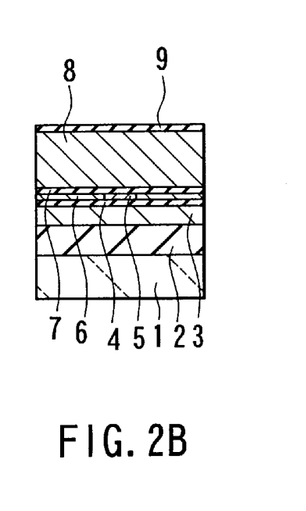

In the method of manufacturing a thin-film magnetic head of the present embodiment, as shown in FIGS. 2A and 2B, the insulating layer 2 made of an insulating material such as alumina ($Al_2O_3$) is formed to a thickness of 1 to 5 $\mu$m, for example, on the substrate 1 made of a ceramic material such as aluminum oxide and titanium carbide ($Al_2O_3$—TiC) through sputtering or the like. On the insulating layer 2, the bottom shield layer 3 made of a magnetic material such as Permalloy (NiFe) is formed to a thickness of about 3 $\mu$m, for example, through sputtering, plating or the like, for making the read head.

Next, on the bottom shield layer 3, the bottom shield gap film 4 made of an insulating material such as alumina is formed through sputtering or the like to a thickness of 10 to 200 nm, for example. Next, on the bottom shield gap film 4, the MR element 5 for reading is formed through sputtering or the like to a thickness of tens of nanometers, for example,.

Next, on the bottom shield gap film 4, a pair of electrode layers 6 are formed through sputtering or the like to a thickness of tens of nanometers. The electrode layers 6 are electrically connected to the MR element 5. Next, on the bottom shield gap film 4 and the MR element 5, the top shield gap film 7 made of an insulating material such as alumina is formed through sputtering or the like to a thickness of 10 to 200 nm, for example.

The above-described layers that make up the read head are patterned through an etching process or a lift-off process or a combination thereof, using patterned resists.

Next, on the top shield gap film 7, the bottom pole layer 8 made of a magnetic material and used for both the read head and the write head is formed to a thickness of about 3 to 4 $\mu$m, for example. The magnetic material used for the bottom pole layer 8 is a soft magnetic material such as NiFe, CoFe, CoFeNi, and FeN. The bottom pole layer 8 is formed through sputtering or plating, or the like.

In place of the bottom pole layer 8, there may be provided a top shield layer, a separation layer made of a non-magnetic material such as alumina formed on the top shield layer through sputtering or the like, and a bottom pole layer formed on the separation layer.

Next, the write gap layer 9 made of an insulating material such as alumina is formed to a thickness of 150 to 300 nm, for example, on the bottom pole layer 8 through sputtering or the like. Next, a portion of the write gap layer 9 located in the center portion of the thin-film coil to be described later is etched to form the contact hole 9a for making a magnetic path.

Next, the insulating layer 10 made of a thermoset photoresist, for example, is formed in a portion in which the thin-film coil is to be formed on the write gap layer 9. Next, the first layer 11 of the thin-film coil made of a conductive material such as copper (Cu) is formed on the insulating layer 10 through frame plating or the like. The insulating layer 12 made of a thermoset photoresist, for example, is then formed to cover the insulating layer 10 and the first layer 11 of the thin-film coil. Next, the second layer 13 of the thin-film coil made of a conductive material such as copper is formed on the insulating layer 12 through frame plating or the like. The insulating layer 14 made of a thermoset photoresist, for example, is formed to cover the second layer 13 of the thin-film coil. The first layer 11 and the second layer 13 of the thin-film coil are connected to each other and wound around the contact hole 9a.

Figure 3A:
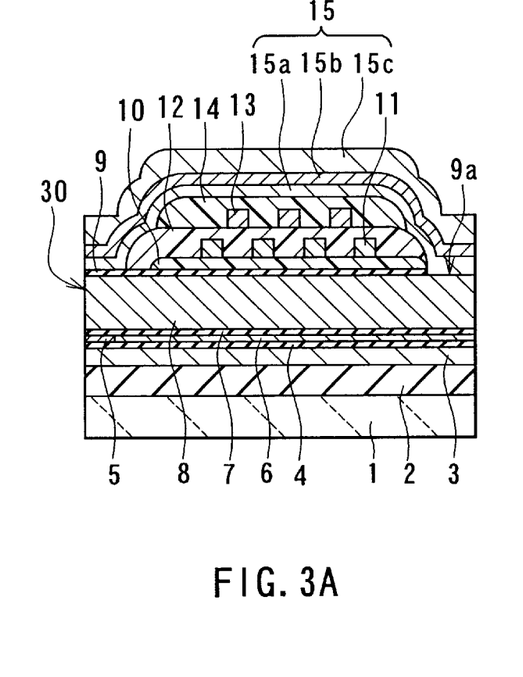
FIGS. 3A and 3B are cross sections for illustrating a step that follows FIGS. 2A and 2B.
Figure 3B:
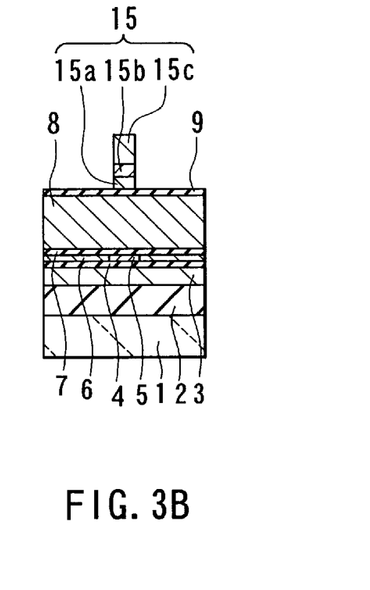

As shown in FIGS. 3A and 3B, the first layer 15a of the top pole layer 15 is formed by sputtering or the like so as to extend from the air bearing surface (the medium facing surface) 30 to the contact hole 9a over the insulating layers 12 and 14. The end of the first layer 15a farther from the air bearing surface 30 is connected to the bottom pole layer 8 via the contact hole 9a formed in the write gap layer 9. Next, on the first layer 15a, the second layer 15b of the top pole layer 15 is formed by frame plating or the like. On the second layer 15b, the third layer 15c of the top pole layer 15 is formed by frame plating or the like. In such a manner, the top pole layer 15 made up of the first, second, and third layers 15a, 15b, and 15c is formed.

Figure 4A:
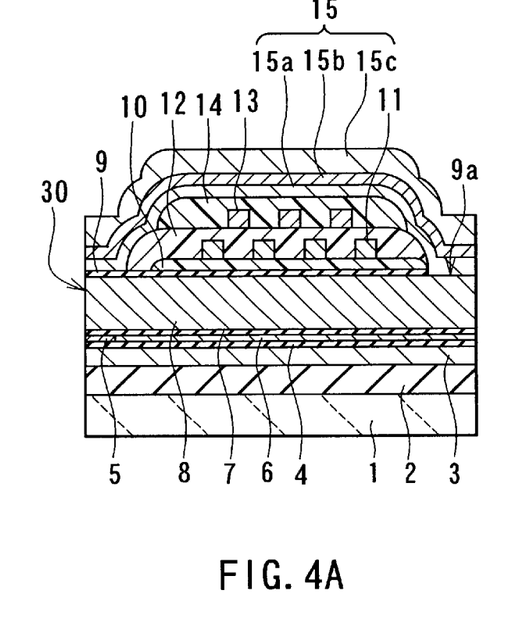
FIGS. 4A and 4B are cross sections for illustrating a step that follows FIGS. 3A and 3B.
Figure 4B:
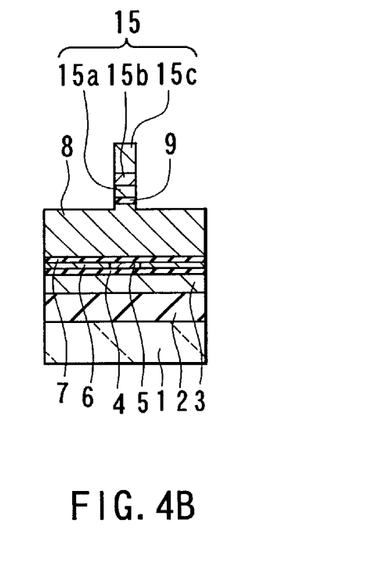

Next, as shown in FIGS. 4A and 4B, the write gap layer 9 is etched through dry etching, using the pole portion of the top pole layer 15 as a mask. This dry etching may be reactive ion etching (RIE) or ion milling and the like. Next, the top shield layer 8 is selectively etched by about 0.3 to 0.6 $\mu$m, for example, through argon ion milling, for example. A trim structure as shown in FIG. 4B is thus formed. The trim structure suppresses an increase in the effective track width due to expansion of a magnetic flux generated during writing in a narrow track.

Next, as shown in FIGS. 1A and 1B, the protection layer 16 made of an insulating material such as $Al_2O_3$ or $SiO_2$ and is formed over the entire surface to a thickness of 5 to 50 $\mu$m, for example, through sputtering or the like. The surface of the protection layer 16 is flattened and pads (not shown) for electrodes are formed thereon. Finally, lapping of the slider including the foregoing layers is performed to form the air bearing surface 30 of the thin-film magnetic head including the write head and the read head. The thin-film magnetic head of the embodiment is thus completed.

In the thin-film magnetic head according to the embodiment, as described above, the top pole layer 15 includes: the first layer 15a having surfaces one of which is adjacent to the write gap layer 9; the second layer 15b having surfaces one of which is adjacent to the other surface of the first layer 15a; and the third layer 15c having surfaces one of which is adjacent to the other surface of the second layer 15b. The saturation flux density B2 of the second layer 15b is higher than the saturation flux density B3 of the third layer 15c, and the saturation flux density B1 of the first layer 15a is higher than the saturation flux density B2 of the second layer 15b.

Within the range satisfying the relations of B1>B2>B3, the value of the saturation flux density B1 of the first layer 15a preferably falls within a range of 1.0 to 2.4 T (tesla), the value of the saturation flux density B2 of the second layer 15b preferably falls within a range of 0.9 to 2.2 T, and the value of the saturation flux density B3 of the third layer 15c preferably falls within a range of 0.8 to 2.0 T.

When the thickness of the first layer 15a in the air bearing surface 30 is expressed as T1 and that of the second layer 15b in the air bearing surface 30 is expressed as T2, the value of T1/(T1+T2) is preferably in a range from not less than 0.025 to not more than 0.5 and, more preferably, in a range from not less than 0.05 to not more than 0.25. The reason will be detailed later.

The value of B2/B1 is preferably in a range from not less than 0.65 to not more than 0.95 and, more preferably, in a range from not less than 0.75 to not more than 0.95. The reason will also be detailed later.

As described above, at least in the magnetic pole portion, the first to third layers 15a to 15c of the top pole layer 15 have different saturation flux densities such that the closer the layer to the gap layer 9, the higher the saturation flux density. This makes it possible to suppress a decrease in the magnetic flux reaching to the end of the magnetic pole portion of the top pole layer 15 on a side of the air bearing surface 30 and to thereby increase the intensity of the magnetic field generated by the write head. Further, with this configuration, as compared with the case where the top pole layer 15 is made up of two layers, the area in which greater magnetic field is generated in the air bearing surface 30 can be reduced to a narrower area close to the write gap layer 9. From the above, the thin-film magnetic head and the method of manufacturing the same of the embodiment make it possible, even when the pole width is small, to increase the intensity of the magnetic field generated from the magnetic pole portion in the air bearing surface 30, and to suppress spread of the magnetic flux in the air bearing surface 30. The effects of the increase in the intensity of the generated magnetic field can be evaluated by overwrite property that is a parameter indicating one of characteristics when data is written over existing data. The effects of the suppression of the spread of the magnetic flux can be evaluated by NLTS or a difference between the width of the magnetization pattern (effective track width) in the recording medium and the pole width (optical track width).

Described below are the results of comparison between a thin-film magnetic head of an example of the embodiment and a thin-film magnetic head of a comparative example in which the top pole layer is made up of two layers, with respect to the overwrite property, NLTS, and the difference (hereinafter called a track width error) between the magnetization pattern (effective track width) in the recording medium and the pole width (optical track width).

In the thin-film magnetic head of the example of the embodiment, the first layer 15a of the top pole layer 15 was made of an FeN layer, the second layer 15b was made of a CoNiFe layer, and the third layer 15c was made of an NiFe layer. The thickness T1 of the first layer 16a, the thickness T2 of the second layer 15b, and the thickness T3 of the third layer 15c, in the air bearing surface 30, were 50 nm, 450 nm, and 2000 nm, respectively. The saturation flux densities B1, B2, and B3 of the first, second, and third layers 15a, 15b, and 15c were 2.0 T, 1.8 T, and 0.9 T, respectively.

On the other hand, in the thin-film magnetic head of the comparative example, the top pole layer was made up of a first layer and a second layer, one of surfaces of the first layer being adjacent to a write gap layer, and one of surfaces of the second layer being adjacent to the other surface of the first layer. In this comparative example, the first layer was made of an FeN layer and the second layer was made of an NiFe layer. The thickness of the first layer in the air bearing surface was 500 nm, and that of the second layer in the air bearing surface was 2000 nm. The saturation flux density of the first layer was 2.0 T and that of the second layer was 0.9 T.

In the thin-film magnetic heads of the example of the embodiment and the comparative example, the FeN layer was formed through sputtering using a DC magnetron sputtering system, and the CoNiFe layer and the NiFe layer were formed through electroplating.

Subsequently, electromagnetic converting characteristics of the thin-film magnetic heads of the example of the embodiment and the comparative example were measured by using a recording medium having coercivity of 3350 Oe (3350×79 A/m) under the conditions that a recording frequency was 180 MHz and rotational speed of the recording medium was 7200 rpm. As the electromagnetic converting characteristics, overwrite property (hereinafter also referred to as OW) and NLTS were measured. The track width errors were measured for the thin-film magnetic heads of the example of the embodiment and the comparative example. The results of the measurements are shown in the following table.

TABLE 1

|  | Example of embodiment | Comparative example |
| --- | --- | --- |
| OW (−dB) | 34 | 35 |
| NLTS (−dB) | 20 | 15 |
| track width error (μm) | 0.05 | 0.09 |

As seen from the table, in the head of the example of the embodiment, although the saturation flux density of the entire top pole layer is lower than that of the head of the comparative example, the overwrite property is hardly deteriorated, NLTS is improved, and the track width error is smaller.

An experiment conducted to obtain a preferred range of the value of T1/(T1+T2) will now be described. In the experiment, a plurality of thin-film magnetic heads having different values of T1/(T1+T2) were fabricated, in each of which the top pole layer 15 was made up of the first, second, and third layers 15a, 15b, and 15c, and the overwrite property and NLTS were measured for each head. In the fabricated thin-film magnetic heads, the saturation flux densities B1, B2, and B3 of the first, second, and third layers 15a, 15b, and 15c were 2.0 T, 1.7 T, and 1.0 T, respectively. Further, in the fabricated heads, the sum T1+T2 of the thicknesses of the first layer 15a and the second layer 15b in the air bearing surface 30 was 1.0 μm, and the thickness T3 of the third layer 15c was 1.5 μm. The results of the experiment are shown in the following table and FIG. 7. The case where the value of T1/(T1+T2) is 1 is a case where the top pole layer 15 is made up of only the first and third layers 15a and 15c.

TABLE 2

| T1/(T1 + T2) | NLTS (−dB) | OW (−dB) |
| --- | --- | --- |
| 0.01 | 13 | 26 |
| 0.025 | 17 | 29 |
| 0.05 | 21 | 36 |
| 0.1 | 23 | 39 |
| 0.25 | 22 | 41 |

TABLE 2-continued

| T1/(T1 + T2) | NLTS (−dB) | OW (−dB) |
| --- | --- | --- |
| 0.5 | 15 | 44 |
| 1 | 7 | 45 |

Figure 7:
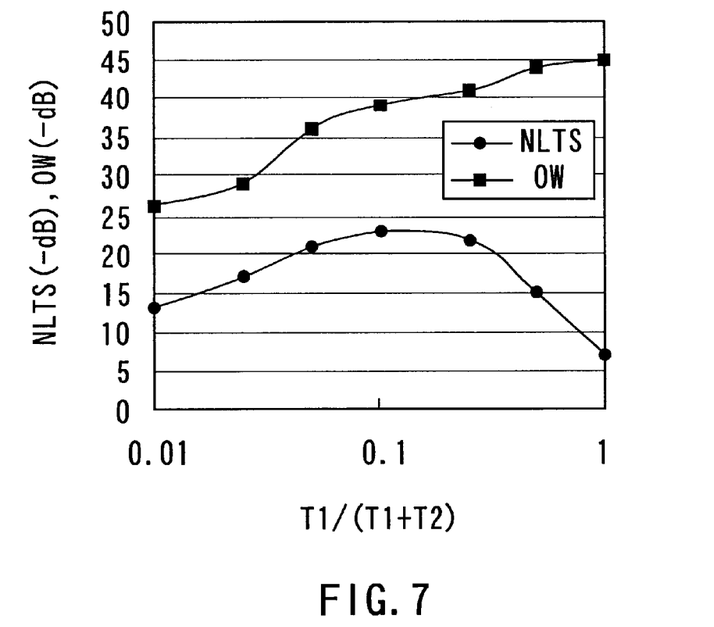
FIG. 7 is a characteristic diagram showing the relation between the thickness of each of first and second layers of a top pole layer in a thin-film magnetic head and each of overwrite property and NLTS.

As seen from Table 2 and FIG. 7, when the value T1/(T1+T2) is 1, that is, when the top pole layer 15 is made up of only the first and third layers 15a and 15c, NLTS deteriorates although the overwrite property is good. In contrast, when the top pole layer 15 is made up of the first, second, and third layers 16a, 15b, and 15c, NLTS can be improved without deteriorating the overwrite property so much. When the value of T1/(T1+T2) is 0.5, as compared with the case where T1/(T1+T2) is 1, the overwrite property hardly deteriorates and NLTS is improved. The smaller the value of T1/(T1+T2), the more the overwrite property deteriorates. It is preferable that the overwrite property is about −30 dB or less. When the value of T1/(T1+T2) is 0.025, the overwrite property is −29 dB which is close to −30 dB. When the value of T1/(T1+T2) becomes less than 0.025, the overwrite property deteriorates more. Therefore, the value of T1/(T1+T2) is preferably in the range from not less than 0.025 to not more than 0.5. NLTS becomes the best value when the value of T1/(T1+T2) is in the range from not less than 0.05 to not more than 0.25. Therefore, the value of T1/(T1+T2) is more preferably in the range from not less than 0.05 to not less than 0.25.

An experiment conducted to obtain a preferable range of the value of B2/B1 will now be described. In the experiment, a plurality of thin-film magnetic heads having different values of B2/B1 were fabricated, in each of which the top pole layer 15 was made up of the first, second, and third layers 15a, 15b, and 15c, and the overwrite property and NLTS were measured for each head. In the fabricated thin-film magnetic heads, the saturation flux densities B1, B2, and B3 of the first, second, and third layers 15a, 15b, and 15c were 2.0 T, 1.0 to 2.0 T, and 1.0 T, respectively. Further, in the fabricated heads, the thicknesses T1, T2, and T3 of the first, second, and third layers 15a, 15b, and 15c in the air bearing surface 30 were 0.25 μm, 0.75 μm, and 1.5 μm, respectively. The results of the experiment are shown in the following table and FIG. 8. When the value of B2/B1 is 1, both of B1 and B2 are 2.0 T. This is the case where the top pole layer 15 is made up of only the first and third layers 15a and 15c.

TABLE 3

| B2 (T) | B1 (T) | B2/B1 | NLTS (−dB) | OW (−dB) |
| --- | --- | --- | --- | --- |
| 1.0 | 2.0 | 0.50 | 13 | 26 |
| 1.3 | 2.0 | 0.65 | 15 | 29 |
| 1.5 | 2.0 | 0.75 | 20 | 38 |
| 1.8 | 2.0 | 0.90 | 23 | 42 |
| 1.9 | 2.0 | 0.95 | 18 | 43 |
| 2.0 | 2.0 | 1.00 | 7 | 45 |

Figure 8:
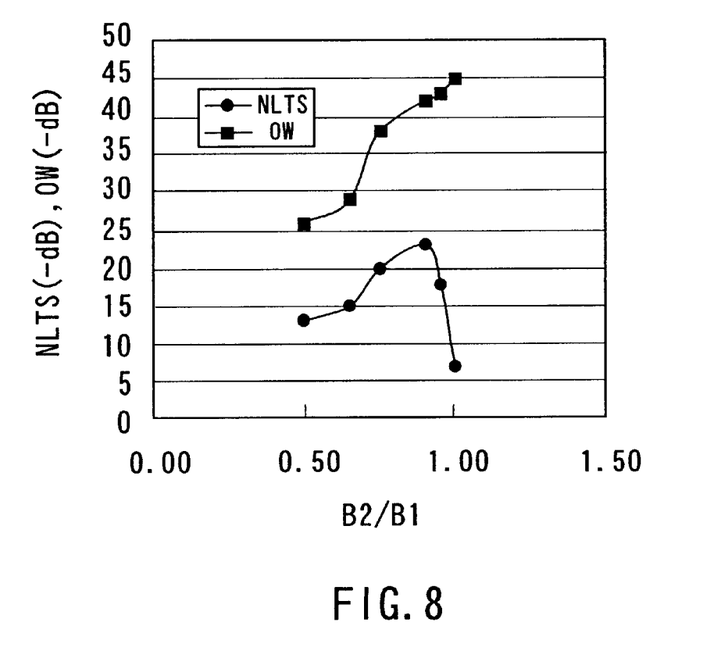
FIG. 8 is a characteristic diagram showing the relation between the saturation magnetic flux density of each of the first and second layers of the top pole layer in the thin-film magnetic head and each of overwrite property and NLTS.

As seen from the above table and FIG. 8, when the value B2/B1 is 1, that is, when the top pole layer 15 is made up of only the first and third layers 15a and 15c, NLTS deteriorates although the overwrite property is good. In contrast, when the top pole layer 15 is made up of the first, second, and third layers 15a, 15b, and 15c, NLTS can be improved without deteriorating the overwrite property so much. When the value of B2/B1 is 0.95, as compared with the case where the value of B2/B1 is 1, the overwrite property hardly deteriorates and NLTS is improved. The smaller the value of B2/B1, the more the overwrite property deteriorates. It is preferable that the overwrite property is about −30 dB or less. When the value of B2/B1 is 0.65, the overwrite property is −29 dB which is close to −30 dB. When the value of B2/B1 becomes less than 0.65, the overwrite property deteriorates more. Therefore, the value of B2/B1 is preferably in the range from not less than 0.65 to not more than 0.95. NLTS becomes the best value when the value of B2/B1 is in the range from not less than 0.75 to not more than 0.95. Therefore, the value of B2/B1 is more preferably in the range from not less than 0.75 to not more than 0.95.

Figure 5A:
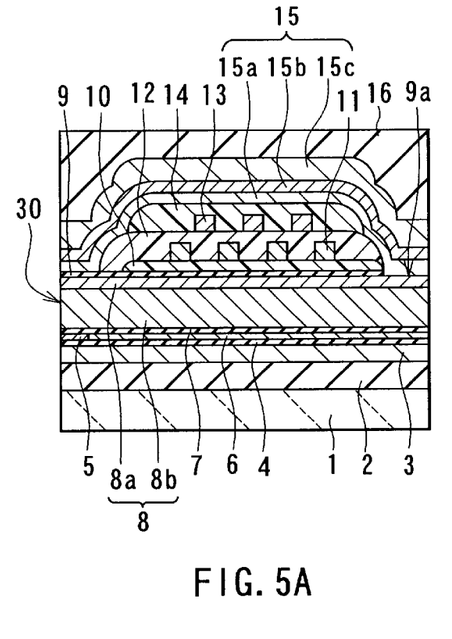
FIGS. 5A and 5B are cross sections showing another example of configuration of the thin-film magnetic head according to the first embodiment of the invention.
Figure 5B:
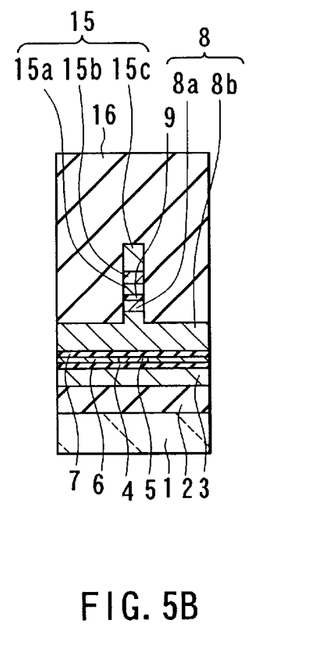
Figure 6A:
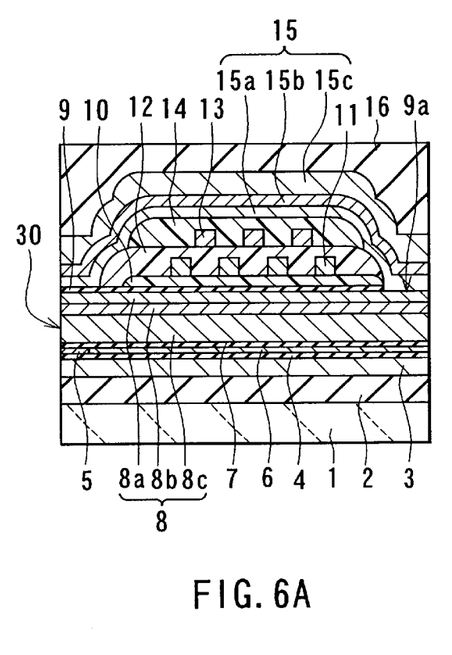
FIGS. 6A and 6B are cross sections showing still another example of configuration of the thin-film magnetic head according to the first embodiment of the invention.
Figure 6B:
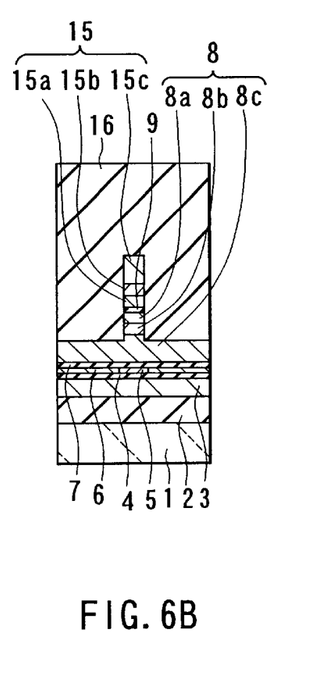

Although the bottom pole layer 8 of the thin-film magnetic head shown in FIGS. 1A and 1B is made up of a single layer, in the thin-film magnetic head according to the present embodiment, the bottom pole layer 8 may be made up of two or more layers shown in FIGS. 5A and 5B or FIGS. 6A and 6B. FIGS. 5A and 5B show the thin-film magnetic head in which the bottom pole layer 8 is made up of two layers. FIGS. 6A and 6B show the thin-film magnetic head in which the bottom pole layer 8 is made up of three layers. FIGS. 5A and 6A are cross sections orthogonal to the air bearing surface. FIGS. 5B an 6B are cross sections of the magnetic pole portion parallel to the air bearing surface.

In the thin-film magnetic head shown in FIGS. 5A and 5B, the bottom pole layer 8 has a second layer 8b formed on the top shield gap film 7, and a first layer 8a formed on the second layer 8b. The write gap layer 9 is formed on the first layer 8a. The saturation flux density of the first layer 8a is higher than that of the second layer 8b. With such a configuration, as compared with the case where the bottom pole layer 8 is made up of a single layer, the intensity of the magnetic field generated from the pole portion in the air bearing surface 30 can be increased.

In the thin-film magnetic head shown in FIGS. 6A and 6B, the bottom pole layer 8 has a third layer 8c formed on the top shield gap film 7, the second layer 8b formed on the third layer 8c, and the first layer 8a formed on the second layer 8b. The write gap layer 9 is formed on the first layer 8a. The saturation flux density of the second layer 8b is higher than that of the third layer 8c, and the saturation flux density of the first layer 8a is higher than that of the second layer 8b. With such a configuration, as compared with the case where the bottom pole layer 8 is made up of a single layer, the intensity of the magnetic field generated from the pole portion in the air bearing surface 30 can be increased, and spread of the magnetic flux in the air bearing surface 30 can be suppressed.

[Second Embodiment]

Figure 9A:
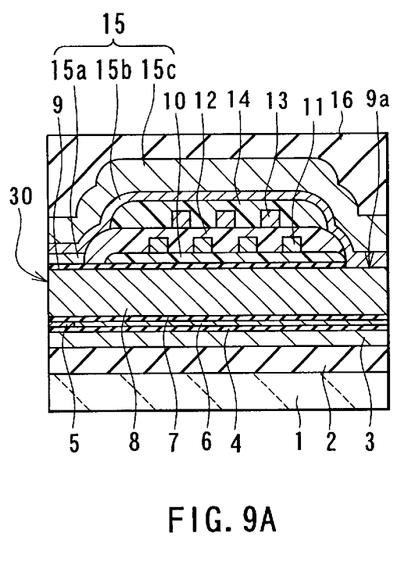
FIGS. 9A and 9B are cross sections for illustrating a method of manufacturing a thin-film magnetic head according to a second embodiment of the invention.
Figure 9B:
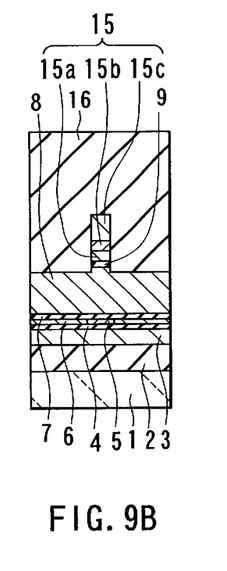

A thin-film magnetic head and a method of manufacturing the same according to a second embodiment of the invention will now be described. FIGS. 9A and 9B are cross sections of the thin-film magnetic head according to this embodiment. FIG. 9A is a cross section orthogonal to the air bearing surface, and FIG. 9B is a cross section of the magnetic pole portion parallel to the air bearing surface.

In the thin-film magnetic head according to the embodiment, the first layer 15a of the top pole layer 15 is provided only in the magnetic pole portion. Therefore, in the embodiment, the top pole layer 15 is made up of three layers of the first, second, and third layers 15a, 15b, and 15c in the magnetic pole portion, and is made up of two layers of the second and third layers 15b and 15c in the other portion. In the method of manufacturing the thin-film magnetic head according to the embodiment, the first layer 15a of the top pole layer 15 is formed only in the magnetic pole portion.

In the embodiment, the portion other than the magnetic pole portion of the top pole layer 15 does not include the first layer 15a. However, in the portion other than the magnetic pole portion, the volume of the magnetic path can be sufficiently secured. Therefore, although the portion other than the magnetic pole portion does not include the first layer 15a having the high saturation flux density, saturation of the magnetic flux can be prevented in the portion other than the magnetic pole portion.

The remainder of the configuration, functions and effects of the second embodiment are similar to those of the first embodiment.

[Third Embodiment]

A thin-film magnetic head and a method of manufacturing the same according to a third embodiment of the invention will now be described.

First, with reference to FIGS. 10A to 15A and FIGS. 10B to 15B, a method of manufacturing the thin-film magnetic head according to the third embodiment will be described. FIGS. 10A to 15A are cross sections orthogonal to the air bearing surface, and FIGS. 10B to 15B are cross sections of the magnetic pole portions each parallel to the air bearing surface.

Figure 10A:
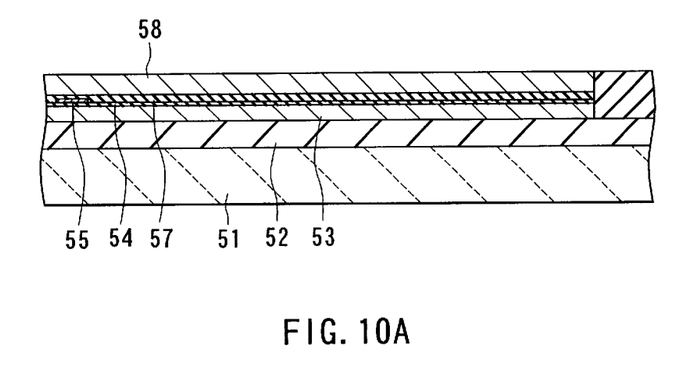
FIGS. 10A and 10B are cross sections for illustrating a method of manufacturing a thin-film magnetic head according to a third embodiment of the invention.
Figure 10B:
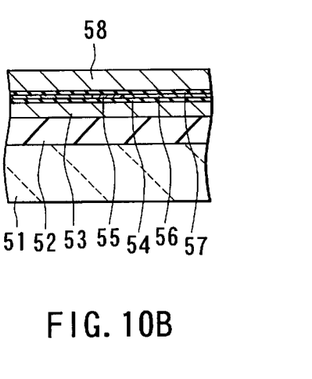

In the method of manufacturing the thin-film magnetic head of the present embodiment, as shown in FIGS. 10A and 10B, an insulating layer 52 made of an insulating material such as alumina ($Al_2O_3$) is first formed to a thickness of 1 to 5 µm, for example, on a substrate 51 made of a ceramic material such as aluminum oxide and titanium carbide ($Al_2O_3$—TiC) through sputtering or the like. On the insulating layer 52, a bottom shield layer 53 made of a magnetic material such as Permalloy is formed to thickness of about 3 µm, for example, through sputtering, plating or the like, for making a read head.

On the bottom shield layer 53, a bottom shied gap film 54 made of an insulating material such as alumina is formed through sputtering or the like to a thickness of, for example, 10 to 200 nm. Subsequently, an MR element 55 for reading is formed on the bottom shield gap film 54 to a thickness of, for example, tens of nanometers, through sputtering or the like. The MR element 55 may be an element utilizing a magnetosensitive film exhibiting magnetoresistivity, such as an AMR (anisotropic magnetoresistive) element, a GMR (giant magnetoresistive) element, or a TMR (tunnel type magnetoresistive) element.

Next, on the bottom shield gap film 54, a pair of electrode layers 56 are formed through sputtering or the like to a thickness of tens of nanometers. The electrode layers 56 are electrically connected to the MR element 55. Next, on the bottom shield gap film 54 and the MR element 55, a top shield gap film 57 made of an insulating material such as alumina is formed through sputtering or the like to a thickness of, for example, 10 to 200 nm.

The above-described layers that make up the read head are patterned through an etching process or a lift-off process or a combination thereof, using patterned resists.

Next, on the top shield gap film 57, a top-shield-layer-cum-bottom-pole layer (hereinafter referred to as the bottom pole layer) 58 is formed to a thickness of, for example, about 3 to 4 µm. The bottom pole layer 58 is made of a magnetic material and used for both a read head and a write head. The magnetic material used for the bottom pole layer 58 is a soft magnetic material such as NiFe, CoFe, CoFeNi, and FeN. The bottom pole layer 58 is formed through sputtering or plating or the like.

In place of the bottom pole layer 58, there may be provided a top shield layer, a separation layer made of a non-magnetic material such as alumina and formed on the top shield layer through sputtering or the like, and a bottom pole layer formed on the separation layer.

Figure 11A:
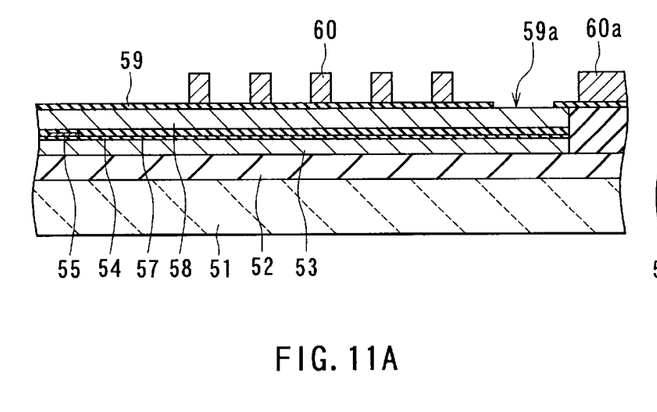
FIGS. 11A and 11B are cross sections for illustrating a step that follows FIGS. 10A and 10B.
Figure 11B:
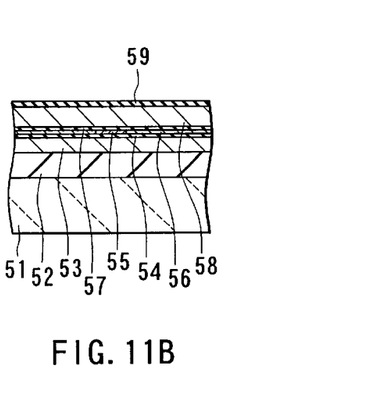

Next, as shown in FIGS. 11A and 11B, the write gap layer 59 made of an insulating material such as alumina is formed on the bottom pole layer 58 through sputtering or the like to a thickness of, for example, 150 to 300 nm. Next, a portion of the write gap layer 59 located in the center portion of a thin-film coil to be described later is etched to form a contact hole 59a for making a magnetic path.

Next, a first layer 60 of the thin-film coil made of copper (Cu), for example, is formed on the write gap layer 59 to a thickness of 2 to 3 $\mu$m, for example. In FIG. 11A, reference numeral 60a represents a connecting section of the first layer 60 for connection to a second layer 65 of the thin-film coil to be described later. The first layer 60 is wound around the contact hole 59a.

Figure 12A:
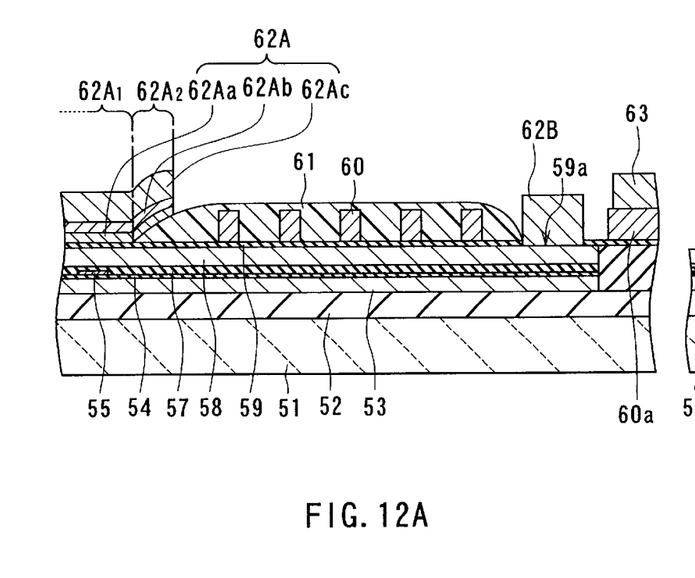
FIGS. 12A and 12B are cross sections for illustrating a step that follows FIGS. 11A and 11B.
Figure 12B:
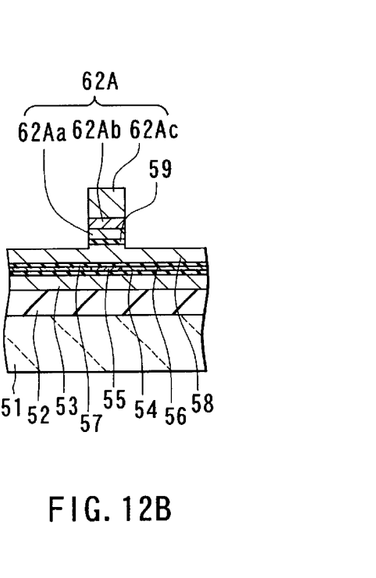

Next, as shown in FIGS. 12A and 12B, an insulating layer 61 is formed in a predetermined pattern to cover the first layer 60 of the thin-film coil and the write gap layer 59 around the same. The insulating layer 61 is made of an organic insulating material that exhibits fluidity when heated, such as photoresist. Next, heat treatment is performed at a predetermined temperature to flatten the surface of the insulating layer 61. As a result of the heat treatment, each of the outer and inner circumferential ends of the insulating layer 61 has a rounded and inclined surface configuration.

A track width defining layer 62A of a top pole layer 62 is then formed from a magnetic material for making a write head on the write gap layer 59 and the insulating layer 61. The track width defining layer 62A is formed in a region ranging from an inclined portion of the insulating layer 61 on a side of an air bearing surface 80 (on the left side of FIG. 12A) to be described later to the air bearing surface 80. The top pole layer 62 is made up of the track width defining layer 62A, and a coupling portion layer 62B and a yoke portion layer 62C to be described later.

The track width defining layer 62A is made up of a first layer 62Aa formed on the write gap layer 59, a second layer 62Ab formed on the first layer 62Aa, and a third layer 62Ac formed on the second layer 62Ab. The first layer 62Aa is formed by, for example, sputtering, and the second layer 62Ab and the third layer 62Ac are formed by, for example, frame plating.

The track width defining layer 62A has an end section $62A_1$, and a connecting section $62A_2$. The end section $62A_1$ is to be a magnetic pole portion of the top pole layer 62 and is formed on the write gap layer 59. The connecting section $62A_2$ is formed on the inclined portion of the insulating layer 61 on a side of the air bearing surface 80 and is connected to the yoke portion layer 62C. The width of the end section $62A_1$, is equal to the track width of the write head.

When the track width defining layer 62A is formed, the coupling portion layer 62B made of a magnetic material is formed on the contact hole 59a, and a connecting layer 63 made of a magnetic material is formed on the connecting section 60a, at the same time. The coupling portion layer 62B constitutes a portion of the top pole layer 62 that is magnetically coupled to the bottom pole layer 58.

Next, the write gap layer 59 and at least a part of the magnetic pole portion of the bottom pole layer 58 located on the side of the write gap layer 59 are etched around the track width defining layer 62A, using the track width defining layer 62A as a mask, to thereby obtain a trim structure as shown in FIG. 12B. For example, reactive ion etching (RIE) is used to etch the write gap layer 59, and ion milling is used to etch the bottom pole layer 58.

Figure 13A:
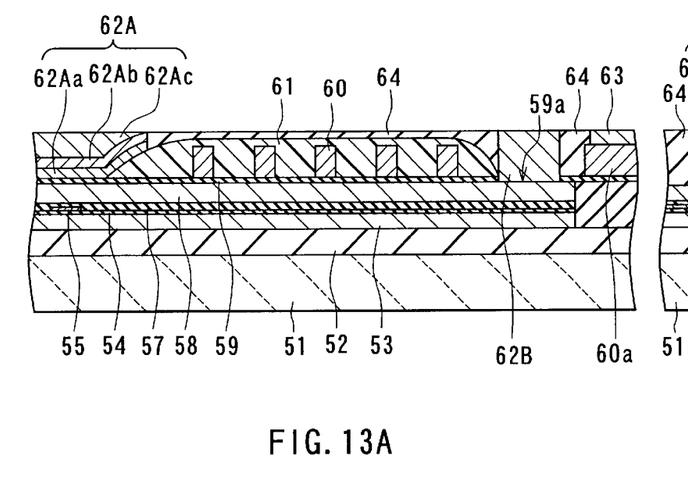
FIGS. 13A and 13B are cross sections for illustrating a step that follows FIGS. 12A and 12B.
Figure 13B:
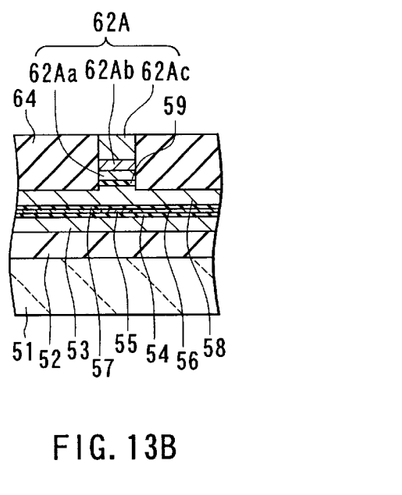

Next, as shown in FIGS. 13A and 13B, an insulating layer 64 made of an inorganic insulating material such as alumina is formed over the entire surface to a thickness of 3 to 4 $\mu$m, for example. Next, the insulating layer 64 is polished through chemical mechanical polishing, for example, so that the surfaces of the track width defining layer 62A, coupling portion layer 62B, and connecting layer 63 are exposed and so that the surface is flattened.

Figures 14A, 14B:
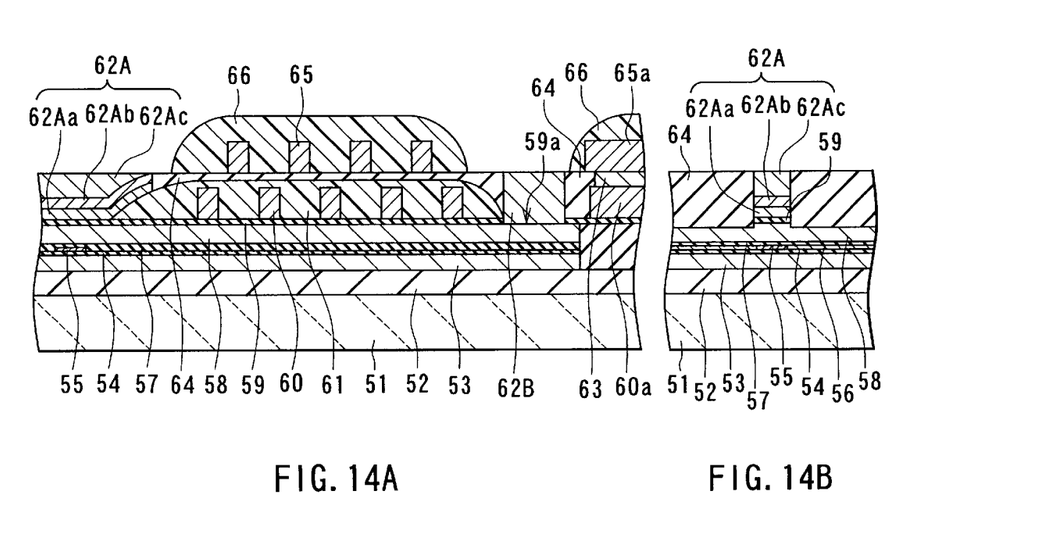
FIGS. 14A and 14B are cross sections for illustrating a step that follows FIGS. 13A and 13B.

Next, as shown in FIGS. 14A and 14B, a second layer 65 of the thin-film coil made of copper (Cu), for example, is formed on the flattened insulating layer 64 to a thickness of 2 to 3 $\mu$m, for example. In FIG. 14A, reference numeral 65a represents a connecting section of the second layer 65 which is connected to the connecting section 60a of the first layer 60 of the coil through the connecting layer 63. The second layer 65 is wound around the coupling portion layer 62B.

Next, an insulating layer 66 is formed in a predetermined pattern so as to cover the second layer 65 of the thin-film coil and the insulating layer 64 around the same. The insulating layer 66 is made of an organic insulating material that exhibits fluidity when heated, such as photoresist. Next, heat treatment is performed at a predetermined temperature to flatten the surface of the insulating layer 66. As a result of the heat treatment, each of the inner and outer circumferential ends of the insulating layer 66 has a rounded and inclined surface configuration.

Figure 15A:
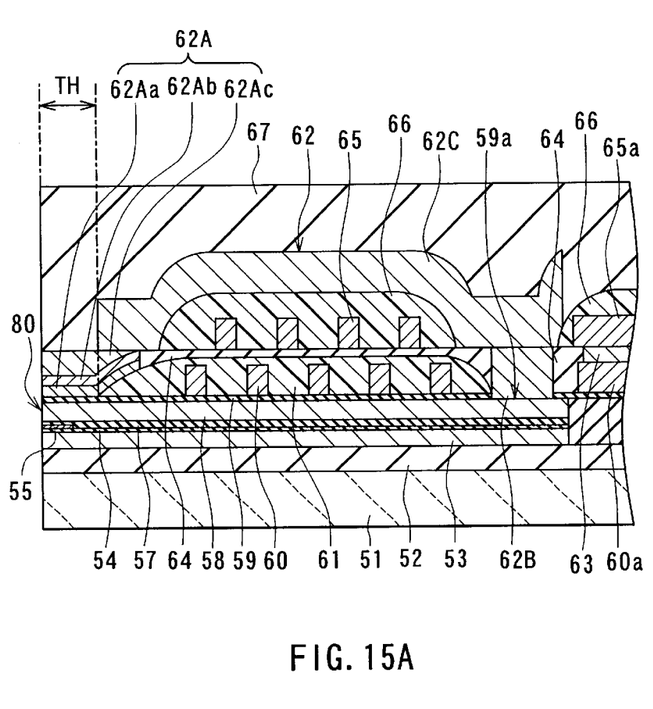
FIGS. 15A and 15B are cross sections for illustrating a step that follows FIGS. 14A and 14B.
Figure 15B:
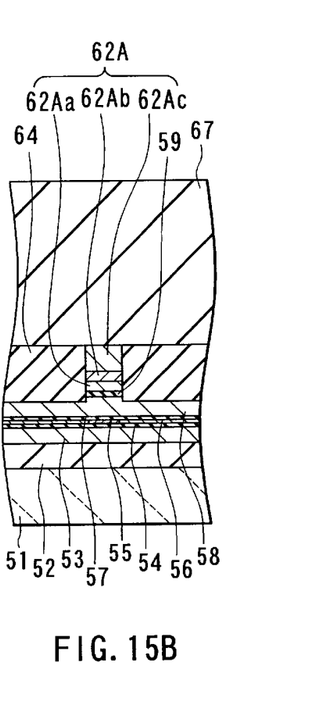

Next, as shown in FIGS. 15A and 15B, the yoke portion layer 62C constituting a yoke portion of the top pole layer 62 is formed from a magnetic material used for making the write head, such as Permalloy, on the track width defining layer 62A, the insulating layers 64 and 66 and the coupling portion layer 62B. An end of the yoke portion layer 62C facing the air bearing surface 80 is located away from the air bearing surface 80. The yoke portion layer 62C is connected to the bottom pole layer 58 through the coupling portion layer 62B.

Subsequently, an overcoat layer 67 made of alumina, for example, is formed so as to cover the entire surface. The surface is then flattened and a not-shown pad for electrodes is formed thereon. Finally, the slider having the above-described layers is mechanically processed to form the air bearing surface 80 of the thin-film magnetic head including the write head and the read head. The thin-film magnetic head according to the embodiment is thereby completed.

The thin-film magnetic head of the present embodiment produced as described above has a medium facing surface that faces toward a recording medium (air bearing surface 80), the read head, and the write head (induction-type electromagnetic transducer). The read head includes the MR element 55, and the bottom shield layer 53 and the top shield layer (bottom pole layer 58) for shielding the MR element 55. The bottom shield layer 53 and the top shield layer have portions located on a side of the air bearing surface 80 that are opposed to each other, the MR element 55 being located between these portions.

The write head has the bottom pole layer 58 and top pole layer 62 magnetically coupled to each other, each of which includes at least one layer. The bottom pole layer 58 and the top pole layer 62 include the magnetic pole portions that are opposed to each other and placed in regions on a side of the air bearing surface 80. The write head further has: the write gap layer 59 provided between the pole portion of the bottom pole layer 58 and the pole portion of the top pole layer 62; and the thin-film coil including the layers 60 and 65. At least part of the coil is disposed between the bottom pole layer 58 and the top pole layer 62 and insulated from the bottom pole layer 58 and the top pole layer 62. As shown in FIG. 15A, in the thin-film magnetic head of the present embodiment, the length from the air bearing surface 80 to the end of the insulating layer 61 on a side of the air bearing surface 80 is a throat height TH.

In the thin-film magnetic head according to the embodiment, the bottom pole layer 58 is disposed on the rear side in the travel direction of the recording medium (the air-inflow-end side in the slider including the thin-film magnetic head) and the top pole layer 62 is disposed on the front side in the travel direction of the recording medium (the air-outflow-end side in the slider including the thin-film magnetic head).

In the present embodiment, the bottom pole layer 58 corresponds to the first magnetic layer of the invention, and the top pole layer 62 corresponds to the second magnetic layer of the invention.

In the embodiment, the top pole layer 62 is made up of the track width defining layer 62A, the coupling portion layer 62B, and the yoke portion layer 62C. The track width defining layer 62A includes: the first layer 62Aa having surfaces one of which (the bottom surface) is adjacent to the write gap layer 59; the second layer 62Ab having surfaces one of which (the bottom surface) is adjacent to the other surface (the top surface) of the first layer 62Aa; and the third layer 62Ac having surfaces one of which (the bottom surface) is adjacent to the other surface (the top surface) of the second layer 62Ab. A saturation flux density of the second layer 62Ab is higher than that of the third layer 62Ac, and a saturation flux density of the first layer 62Aa is higher than that of the second layer 62Ab. That is, the saturation flux densities of the first layer 62Aa to the third layer 62Ac are made different such that the closer the layer to the write gap layer 59, the higher the saturation flux density.

In the embodiment, if the saturation flux densities of the first to third layers 62Aa to 62Ac are expressed as B1 to B3, respectively, a preferable range of each of B1 to B3 is similar to that of each of B1 to B3 in the first embodiment.

In the second embodiment, if the thickness of the first layer 62Aa in the air bearing surface 80 is expressed as T1 and the thickness of the second layer 62Ab in the air bearing surface 80 as T2, a preferable range of the value of T1/(T1+T2) is similar to that of T1/(T1+T2) in the first embodiment.

Further, a preferable range of the value of B2/B1 in the third embodiment is similar to that of B2/B1 in the first embodiment.

According to the third embodiment, in the top pole layer 62, only the track width defining layer 62A including the pole portion includes the three layers of the first, second, and third layers 62Aa, 62Ab, and 62Ac. In the portion other than the pole portion, however, the volume of the magnetic path can be sufficiently secured. Therefore, even if the portion other than the pole portion does not include the first layer 62Aa having a high saturation flux density, saturation of the magnetic flux can be prevented in the portion other than the pole portion.

The remainder of the configuration, functions and effects of the second embodiment are similar to those of the first embodiment.

The invention is not limited to the foregoing embodiments but can be variously modified. For example, the foregoing embodiments disclose the examples in which only the top pole layer or both the top and bottom pole layers include(s) three layers at least in the pole portion. Alternatively, only the bottom pole layer may include the three layers at least in the pole portion.

In the present invention, at least one of the pole layers may include four or more layers at least in the pole portion, and the saturation flux densities of those layers may differ such that the closer the layer to the write gap layer, the higher the saturation flux density.

In the foregoing embodiments, the thin-film magnetic heads are disclosed, comprising the MR element for reading formed on the base body and the induction-type electromagnetic transducer for writing stacked on the MR element. Alternatively, the MR element may be stacked on the magnetic transducer.

That is, the induction-type electromagnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing toward the bottom pole layer with a recording gap film in between.

The invention may be applied to a thin-film magnetic head dedicated to writing that has an induction-type electromagnetic transducer only or to a thin-film magnetic head performing writing and reading through an induction-type electromagnetic transducer.

As described above, in the thin-film magnetic head or the method of manufacturing the same of the invention, at least one of the first and second magnetic layers includes three layers at least in the pole portion. The three layers have different saturation flux densities such that the closer the layer to the write gap layer, the higher the saturation flux density. Thus, according to the thin-film magnetic head or the method of manufacturing the same of the invention, even when the pole width is narrow, it is possible to increase the intensity of the magnetic field generated from the pole portion in the medium facing surface, and to suppress spread of the flux in the medium facing surface.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers and a thin-film coil at least a part of which is placed between the first and second magnetic layers and insulated from the first and second magnetic layers, wherein:

at least one of the first and second magnetic layers includes, at least in the magnetic pole portion, a first layer having surfaces one of which is in contact with the gap layer, a second layer having surfaces one of which is in contact with the other surface of the first layer, and a third layer having surfaces one of which is in contact with the other surface of the second layer;

the second layer has a saturation flux density higher than a saturation flux density of the third layer, and the first layer has a saturation flux density higher than the saturation flux density of the second layer; and the third layer has a thickness greater than a thickness of the second layer.

2. A thin-film magnetic head according to claim 1, herein, when the thickness of the first layer in the medium facing surface is expressed as T1 and the thickness of the second layer in the medium facing surface is expressed as T2, the value of T1/(T1+T2) is in a range from not less than 0.025 to not more than 0.5.

3. A thin-film magnetic head according to claim 1, wherein, when the thickness of the first layer in the medium facing surface is expressed as T1 and the thickness of the second layer in the medium facing surface is expressed as T2, the value of T1/(T1+T2) is in a range from not less than 0.05 to not more than 0.25.

4. A thin-film magnetic head according to claim 1, wherein, when the saturation flux density of the first layer is expressed as B1 and the saturation flux density of the second layer is expressed as B2, the value of B2/B1 is in a range from not less than 0.65 to not more than 0.95.

5. A thin-film magnetic head according to claim 1, wherein, when the saturation flux density of the first layer is expressed as B1 and the saturation flux density of the second layer is expressed as B2, the value of B2/B1 is in a range from not less than 0.75 to not more than 0.95.

6. A method of manufacturing a thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers, the method comprising the steps of:

forming the first magnetic layer;
forming the gap layer on the first magnetic layer;
forming the second magnetic layer on the gap layer; and
forming the thin-film coil, wherein:
at least one of the steps of forming the first magnetic layer and forming the second magnetic layer forms, at least in the magnetic pole portion, a first layer having surfaces one of which is in contact with the gap layer, a second layer having surfaces one of which is in contact with the other surface of the first layer, and a third layer having surfaces one of which is in contact with the other surface of the second layer;
the second layer has a saturation flux density higher than a saturation flux density of the third layer, and the first layer has a saturation flux density higher than the saturation flux density of the second layer; and
the third layer has a thickness greater than a thickness of the second layer.

7. A method of manufacturing a thin-film magnetic head according to claim 6, wherein, when the thickness of the first layer in the medium facing surface is expressed as T1 and the thickness of the second layer in the medium facing surface is expressed as T2, the value of T1/(T1+T2) is in a range from not less than 0.025 to not more than 0.5.

8. A method of manufacturing a thin-film magnetic head according to claim 6, wherein, when the thickness of the first layer in the medium facing surface is expressed as T1 and the thickness of the second layer in the medium facing surface is expressed as T2, the value of T1/(T1+T2) is in a range from not less than 0.05 to not more than 0.25.

9. A method of manufacturing a thin-film magnetic head according to claim 6, wherein, when the saturation flux density of the first layer is expressed as B1 and the saturation flux density of the second layer is expressed as B2, the value of B2/B1 is in a range from not less than 0.65 to not more than 0.95.

10. A method of manufacturing a thin-film magnetic head according to claim 6, wherein, when the saturation flux density of the first layer is expressed as B1 and the saturation flux density of the second layer is expressed as B2, the value of B2/B1 is in a range from not less than 0.75 to not more than 0.95.

11. A thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers, wherein:

at least one of the first and second magnetic layers includes, at least in the magnetic pole portion, a first layer having surfaces one of which is in contact with the gap layer, a second layer having surfaces one of which is in contact with the other surface of the first layer, and a third layer having surfaces one of which is in contact with the other surface of the second layer;
the second layer has a saturation flux density higher than a saturation flux density of the third layer, and the first layer has a saturation flux density higher than the saturation flux density of the second layer; and
the first, second, and third layers are the same in width.

12. A thin-film magnetic head according to claim 11, wherein, when the thickness of the first layer in the medium facing surface is expressed as T1 and the thickness of the second layer in the medium facing surface is expressed as T2, the value of T1/(T1+T2) is in a range from not less than 0.025 to not more than 0.5.

13. A thin-film magnetic head according to claim 11, wherein, when the thickness of the first layer in the medium facing surface is expressed as T1 and the thickness of the second layer in the medium facing surface is expressed as T2, the value of T1/(T1+T2) is in a range from not less than 0.05 to not more than 0.25.

14. A thin-film magnetic head according to claim 11, wherein, when the saturation flux density of the first layer is expressed as B1 and the saturation flux density of the second layer is expressed as B2, the value of B2/B1 is in a range from not less than 0.65 to not more than 0.95.

15. A thin-film magnetic head according to claim 11, wherein, when the saturation flux density of the first layer is expressed as B1 and the saturation flux density of the second layer is expressed as B2, the value of B2/B1 is in a range from not less than 0.75 to not more than 0.95.

16. A method of manufacturing a thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers, the method comprising the steps of:

forming the first magnetic layer;
forming the gap layer on the first magnetic layer;

forming the second magnetic layer on the gap layer; and
forming the thin-film coil, wherein:

at least one of the steps of forming the first magnetic layer and forming the second magnetic layer forms, at least in the magnetic pole portion, a first layer having surfaces one of which is in contact with the gap layer, a second layer having surfaces one of which is in contact with the other surface of the first layer, and a third layer having surfaces one of which is in contact with the other surface of the second layer;

the second layer has a saturation flux density higher than a saturation flux density of the third layer, and the first layer has a saturation flux density higher than the saturation flux density of the second layer; and the first, second, and third layers are the same in width.

17. A method of manufacturing a thin-film magnetic head according to claim 16, wherein, when the thickness of the first layer in the medium facing surface is expressed as T1 and the thickness of the second layer in the medium facing surface is expressed as T2, the value of T1/(T1+T2) is in a range from not less than 0.025 to not more than 0.5.

18. A method of manufacturing a thin-film magnetic head according to claim 16, wherein, when the thickness of the first layer in the medium facing surface is expressed as T1 and the thickness of the second layer in the medium facing surface is expressed as T2, the value of T1/(T1+T2) is in a range from not less than 0.05 to not more than 0.25.

19. A method of manufacturing a thin-film magnetic head according to claim 16, wherein, when the saturation flux density of the first layer is expressed as B1 and the saturation flux density of the second layer is expressed as B2, the value of B2/B1 is in a range from not less than 0.65 to not more than 0.95.

20. A method of manufacturing a thin-film magnetic head according to claim 16, wherein, when the saturation flux density of the first layer is expressed as B1 and the saturation flux density of the second layer is expressed as B2, the value of B2/B1 is in a range from not less than 0.75 to not more than 0.95.

21. A thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers, wherein:

at least one of the first and second magnetic layers includes, at least in the magnetic pole portion, a first layer having surfaces one of which is in contact with the gap layer, a second layer having surfaces one of which is in contact with the other surface of the first layer, and a third layer having surfaces one of which is in contact with the other surface of the second layer;

the second layer has a saturation flux density higher than a saturation flux density of the third layer, and the first layer has a saturation flux density higher than the saturation flux density of the second layer;

the third layer has a thickness greater than a thickness of the second layer; and the first, second, and third layers are the same in width.

22. A thin-film magnetic head according to claim 21, wherein, when the thickness of the first layer in the medium facing surface is expressed as T1 and the thickness of the second layer in the medium facing surface is expressed as T2, the value of T1/(T1+T2) is in a range from not less than 0.025 to not more than 0.5.

23. A thin-film magnetic head according to claim 21, wherein, when the thickness of the first layer in the medium facing surface is expressed as T1 and the thickness of the second layer in the medium facing surface is expressed as T2, the value of T1/(T1+T2) is in a range from not less than 0.05 to not more than 0.25.

24. A thin-film magnetic head according to claim 21, wherein, when the saturation flux density of the first layer is expressed as B1 and the saturation flux density of the second layer is expressed as B2, the value of B2/B1 is in a range from not less than 0.65 to not more than 0.95.

25. A thin-film magnetic head according to claim 21, wherein, when the saturation flux density of the first layer is expressed as B1 and the saturation flux density of the second layer is expressed as B2, the value of B2/B1 is in a range from not less than 0.75 to not more than 0.95.

26. A method of manufacturing a thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers, the method comprising the steps of:

forming the first magnetic layer;
forming the gap layer on the first magnetic layer;
forming the second magnetic layer on the gap layer; and
forming the thin-film coil, wherein:

at least one of the steps of forming the first magnetic layer and forming the second magnetic layer forms, at least in the magnetic pole portion, a first layer having surfaces one of which is in contact with the gap layer, a second layer having surfaces one of which is in contact with the other surface of the first layer, and a third layer having surfaces one of which is in contact with the other surface of the second layer;

the second layer has a saturation flux density higher than a saturation flux density of the third layer, and the first layer has a saturation flux density higher than the saturation flux density of the second layer;

the third layer has a thickness greater than a thickness of the second layer; and the first, second, and third layers are the same in width.

27. A method of manufacturing a thin-film magnetic head according to claim 26, wherein, when the thickness of the first layer in the medium facing surface is expressed as T1 and the thickness of the second layer in the medium facing surface is expressed as T2, the value of T1/(T1+T2) is in a range from not less than 0.025 to not more than 0.5.

28. A method of manufacturing a thin-film magnetic head according to claim 26, wherein, when the thickness of the first layer in the medium facing surface is expressed as T1 and the thickness of the second layer in the medium facing surface is expressed as T2, the value of T1/(T1+T2) is in a range from not less than 0.05 to not more than 0.25.

29. A method of manufacturing a thin-film magnetic head according to claim 26, wherein, when the saturation flux density of the first layer is expressed as B1 and the saturation flux density of the second layer is expressed as B2, the value of B2/B1 is in a range from not less than 0.65 to not more than 0.95.

30. A method of manufacturing a thin-film magnetic head according to claim 26, wherein, when the saturation flux density of the first layer is expressed as B1 and the saturation flux density of the second layer is expressed as B2, the value of B2/B1 is in a range from not less than 0.75 to not more than 0.95.

* * * * *